United States Patent [19]
Voss et al.

[11] Patent Number: 5,861,470
[45] Date of Patent: Jan. 19, 1999

[54] TWO COMPONENT WATER-BASED ADHESIVES FOR USE IN DRY-BOND LAMINATING

[75] Inventors: Peter A. Voss, St. Paul; Thomas E. Rolando, Maple Grove, both of Minn.

[73] Assignee: H. B. Fuller Licensing & Financing, Inc.

[21] Appl. No.: 816,759

[22] Filed: Mar. 7, 1997

[51] Int. Cl.⁶ .................................................. C08G 18/10
[52] U.S. Cl. ........................... 528/59; 525/457; 528/71; 528/73; 524/840; 156/331.4; 428/422.8
[58] Field of Search ...................... 428/422.8; 156/331.4; 524/840; 528/73, 71, 59; 525/457

[56] References Cited

U.S. PATENT DOCUMENTS

| | | | |
|---|---|---|---|
| 3,887,757 | 6/1975 | Stone et al. | 428/425 |
| 3,982,986 | 9/1976 | Stone et al. | 156/308 |
| 4,147,679 | 4/1979 | Scriven et al. | 428/262 |
| 4,433,095 | 2/1984 | Hombach et al. | 524/563 |
| 4,540,633 | 9/1985 | Kucera et al. | 428/355 |
| 4,663,377 | 5/1987 | Hombach et al. | 524/196 |
| 4,851,459 | 7/1989 | Ramalingam | 523/414 |
| 4,853,061 | 8/1989 | Leung | 156/216 |
| 4,883,694 | 11/1989 | Ramalingam | 428/35.2 |
| 5,250,610 | 10/1993 | Hünsel et al. | 524/591 |
| 5,334,690 | 8/1994 | Schafheutle et al. | 528/71 |
| 5,389,718 | 2/1995 | Potter et al. | 524/591 |
| 5,494,960 | 2/1996 | Rolando et al. | 524/591 |
| 5,532,058 | 7/1996 | Rolando et al. | 428/351 |

FOREIGN PATENT DOCUMENTS

| | | |
|---|---|---|
| 0806443 | of 0000 | European Pat. Off. . |
| 1128568 | 9/1968 | United Kingdom . |

OTHER PUBLICATIONS

"Polyioscyanate Crosslinkers For Aqueous Polyurethane Dispersions", byaer Corporation (Pittsburgh, PA), Desmodur® XO–671—Product Literature—Nov., 1995.

*Primary Examiner*—Rachel Gorr
*Attorney, Agent, or Firm*—Nancy N. Quan

[57] ABSTRACT

The invention discloses two-component water-based laminating adhesives, comprising aqueous polyurethane dispersions and water dispersible polyisocyanates based on the isocyanurates of hexamethylene diisocyanate, having enhanced machining characteristics. The invention further discloses a method for the preparation of dry-bond laminates having enhanced properties including dry-bond clarity and water resistance.

20 Claims, No Drawings

TWO COMPONENT WATER-BASED ADHESIVES FOR USE IN DRY-BOND LAMINATING

FIELD OF THE INVENTION

The invention relates to water-based adhesives. Specifically, it relates to two-component water-based laminating adhesives having enhanced properties including machinability, dry-bond clarity and water resistance. More specifically, it relates to laminating adhesives comprising aqueous polyurethane dispersions and water dispersible isocyanurates of hexamethylene diisocyanate.

BACKGROUND OF THE INVENTION

It is well known that water dispersible polyisocyanates can be used as crosslinking agents for the preparation of two-component water-based laminating adhesives. Such adhesives have been shown to form laminates having enhanced bond strengths when subjected to increased chemical, thermal and mechanical stresses. Generally, the polyisocyanates are admixed with aqueous polyurethane dispersions and coated onto a flexible film substrate. The coated substrate is then dried and mated with a second flexible substrate, using heat and/or pressure, to form a dry-bond laminate. Several references are described below:

U.S. Pat. No. 5,494,960 (Rolando et al.) discloses two-component water-based laminating adhesives comprising water dispersible polyisocyanates and aqueous polyurethane dispersions. The reference describes isocyanurates as undesirable trimerization products (Column 1, lines 49–57).

U.S. Pat. No. 5,250,610 (Hansel et al.) discloses laminating adhesives comprising anionic polyurethane dispersions. The reference also states, "Additives conventionally used in the processing of adhesives may also be added to the dispersions of laminating adhesives according to the invention, e.g., leveling agents, defoamants, viscosity regulators, crosslinking agents, catalysts, etc." (See column 4, lines 28–32.) The reference fails to teach or suggest the use of water dispersible polyisocyanates based on the isocyanurates of hexamethylene diisocyanate.

Other related documents include: U.S. Pat. No. 1,128,568 (Keberle et al.); U.S. Pat. Nos. 3,887,757 and 3,982,986 (Stone et al.); U.S. Pat. No. 4,147,679 (Scriven et al.); U.S. Pat. No. 5,334,690 (Schafheutle et al.); U.S. Pat. Nos. 4,433,095 and 4,663,377 (Holmbach et al.); U.S. Pat. No. 4,540,633 (Kucera et al.); U.S. Pat. Nos. 4,851,459 and 4,883,694 (Ramalingam) and U.S. Pat. No. 5,532,058 (Rolando et al.).

A drawback with the two-component water-based laminating adhesives described above relates to the particle size distribution, prior to the laminating process. The addition of water dispersible polyisocyanates, to aqueous polyurethane dispersions, often increases the adhesives average particle size distribution. The polyisocyanates react with water and/or other active hydrogen atoms on the aqueous polyurethane dispersion (i.e., amines and hydroxyl groups) to form a vast three dimensional network, which tends to destabilize the dispersion. Such a distribution can adversely affect the dispersions coalescing properties to form adhesives having poor machining characteristics, dry-bond clarity and water resistance.

There remains a need for two-component water-based laminating adhesives, based on polyisocyanate crosslinking agents, having enhanced machining characteristics, bond clarity and water resistance.

SUMMARY OF THE INVENTION

The present invention discloses two-component water-based laminating adhesives comprising the reaction product of:

a) at least one aqueous polyurethane dispersion; and b) at least one water dispersible polyisocyanate based on the isocyanurate of hexamethylene diisocyanate.

The composition described above has been shown to provide two-component laminating adhesives having an average particle size distribution of less than about 80 nanometers, prior to the laminating process.

Surprisingly, the present inventors have now discovered that the addition of water dispersible polyisocyanates based on the isocyanurates of hexamethylene diisocyanate, to aqueous polyurethane dispersions, form laminating adhesives having enhanced humidity resistance.

In another aspect, the present invention discloses a method for the preparation of dry-bonded laminates, having good dry-bond clarity and water resistant bonds, comprising the steps of:

a) coating a first flexible substrate with a laminating adhesive comprising;
   i) at least one aqueous polyurethane dispersion; and
   ii) at least one water dispersible polyisocyanate based on the isocyanurate of hexamethylene diisocyanate;

b) drying the coated flexible substrate, with forced air and heat, to form a dry-coated substrate; then c) applying onto the dry-coated substrate a second flexible substrate using heat and/or pressure.

DETAILED DESCRIPTION OF THE INVENTION

The two-component water-based laminating adhesives described in the present invention have enhanced machining characteristics, bond clarity and water resistant properties.

Laminating adhesives having an average particle size distribution greater than 100 nm may be undesirable to the laminating process in that laminating units, such as roll coaters which utilize gravure cylinder, tend to clog. Clogging often results in uneven coat weights and is especially problematic when the unit is stopped for maintenance or work breaks. It has been found that the adhesives of the present invention, which are characterized as having an average particle size distribution less than about 80 nanometers, are less susceptible to clogging. It is surmised that a reduced average particle size distribution may be, in part, attributed to the polyisocyanate's dispersibility in water. For example, water dispersible polyisocyanates, based on the isocyanurates of hexamethylene diisocyanate, have been shown to provide dispersions having a lower particle size distribution, compared to other water dispersible polyisocyanates. Said isocyanurates are further described in "Polyisocyanate Crosslinkers For Aqueous Polyurethane Dispersions", Bayer Corporation (Pittsburgh, Pa.), Desmodur® XO-671 product literature.

The inventive dry-bond laminates have good clarity and water resistant properties. Such properties are desirable in that many flexible packaging applications (i.e., food packaging) require optically clear and water resistant bonds. It is surmised that the adhesives dry-bond clarity may be, in part, also attributed to the laminating adhesives particle size distribution. A small average particle size distribution enhances the dispersions coalescing properties, during the laminating process, to form clear continuous films. Additionally, the dry-bond laminates have improved water resistant properties. It is surmised that some of these properties may be attributed to the isocyanurate functional groups which are known to have good resistance to chemical and thermal stresses. The properties of isocyanurate linkages are further described in "Structural Adhesives—Chemistry and Technology", S. R. Harthorn, Chapter 4, Pages 190–194, Plenum Press, N.Y., 1986.

At least one aqueous polyurethane dispersion is used in the present invention, and may be nonionic and/or anionic. Anionic polyurethane dispersions based on carboxylate and/or sulfonate groups are preferred. The term "polyurethane", as used herein, is defined as a polymer containing two or more urethane groups and is intended to include polyurethane-urea polymers. The dispersions may have a viscosity in a range of from about 25 centipoise (cps) to about 2,000 cps, preferably from about 50 cps to about 1,000 cps, and more preferably from about 100 cps to about 300 cps. Additionally, the dispersions may have a solid content in a range of from about 10% by weight to about 80% by weight, preferably from about 20% by weight to about 60% by weight, and most preferably from about 30% by weight to about 40% by weight. Suitable commercially available anionic polyurethane dispersions include Hydroflex® WD-4003, WD-4006 and WD-4007 from H.B. Fuller Company (St. Paul, Minn.). The preferred anionic polyurethane dispersions are further described in U.S. Pat. No. 5,494,960 (Rolando et al.), incorporated herein by reference.

The aqueous polyurethane dispersions are often neutralized with tertiary amines including triethylamine. Volatile tertiary amines are preferred in that such amines evaporate during the laminating process to form anionic polyurethanes having increased water resistance. Additionally, the use of tertiary amines, which are free of active hydrogen atoms, are desired in that such materials will not react (i.e., chain terminate) with the polyisocyanate crosslinking agent—thus assuring chain extension. The term "active hydrogen atoms" refers to hydrogens which display activity according to the Zerewitnoff test as described by Kohler in J. Am. Chem. Soc., 49,3181 (1927).

The aqueous polyurethane dispersion is present in the laminating adhesives in a range of from about 25 parts to about 99 parts, and preferably from about 95 parts to about 99 parts, based on 100 parts. Parts outside this range may be undesirable in that a laminating adhesive having a polyurethane dispersion content less than about 50 parts can decrease the laminate's urethane content, thus reducing its cohesion energy through hydrogen bonding. Alternatively, a polyurethane dispersion content greater than about 99 parts may decrease the amount of crosslinking agent present—thus reducing the laminates solvent and tunneling resistance properties.

At least one water dispersible polyisocyanate based on the isocyanurate of hexamethylene diisocyanate is used. Suitable commercially available polyisocyanates include Desmodur® XO-671 and Bayhydur® XP-7063 from Bayer Corporation (Pittsburgh, Pa.). Said polyisocyanates may be added to the aqueous polyurethane dispersion neat or as a pre-dispersed solution in water. The crosslinkers may be present in a range of from about 1 part to about 10 parts, and preferably from about 1 part to about 5 parts, based on 100 parts total. A polyisocyanate content of less than about 1 part can significantly reduce the crosslink density, thus forming laminates having less resistance to chemical, thermal and mechanical stresses. Alternatively, a polyisocyanate content greater than about 5 parts can destabilize and/or gel the adhesive, prior to the laminating process, making them more difficult to process.

Optionally, the laminating adhesives can be blended with other water-based dispersions or emulsions. To meet specific requirements in some adhesive applications, such as tack, green strength and cost, other water dispersible polymers are added and these include acrylics, vinyl/acrylics, styrene/acrylics, vinyl-acetate/ethylene copolymers, polychloroprenes, styrene emulsions, styrene/butadiene emulsions, starches, dextrins, caseins, animal pectins and their mixtures. The non-polyurethane based dispersions may have a solids content in a range of from about 10% by weight to about 80% by weight, and preferably from about 40% by weight to about 60% by weight. The non-polyurethane based dispersions may be present in a range of from about 1 part to about 50 parts, and preferably from about 1 part to about 25 parts, based on 100 total parts.

If desired, the characteristics of the water-based laminating adhesives may be modified by the addition of compounds including surfactants, defoaming agents, coalescing aids, fungicides, bactericides, non-isocyanate based crosslinking agents, plasticizers, thickening agents, fillers, pigments, reactive pigments, dispersing agents for the pigments, colors, perfume-like materials, UV stabilizers, sequestering agents, waxes, oils, fire retardant agents and organic solvents. Such materials may be introduced at any stage of the production process.

The inventive adhesives may be formed wherein at least one water dispersible polyisocyanate, based on the isocyanurate of hexamethylene diisocyanate, is admixed with at least one aqueous polyurethane dispersion prior to the laminating process. Alternatively, the aqueous polyurethane dispersion may be added to the water dispersible crosslinking agent. The materials are, preferably, blended together at ambient room temperatures using mechanical agitation.

The two-component water-based laminating adhesives, described in the present invention, can have a monomodal or multimodal distribution. Said adhesive may have an average particle size distribution in a range of from about 40 nm to about 100 nm, and preferably from about 40 nm to about 80 nm. An average particle size distribution of less than about 40 nm often increases the adhesive's viscosity, making them more difficult to process. Alternatively, an average particle size distribution greater than about 100 nm may form dry-bond laminates having reduced clarity.

Additionally, the inventive adhesives may have a solids content in a range of from about 20% by weight to about 50% by weight, and preferably from about 30% by weight to about 40% by weight. For example, solvent-based laminating adhesives are often run on laminating units at a high speed, a solid content less than about 30% by weight may require extended dry times or special drying equipment to remove the extra solvent, thus increasing the complexity and cost of the operation. Alternatively, a laminating adhesive having a solid content greater than about 40% by weight often increases the adhesive's viscosity, thus making them more difficult to process.

The laminating adhesives may have a pH in a range of from about 6 to about 10, and preferably from about 7 to about 9. A pH of less than about 6 or greater than about 9 often accelerates the isocyanate/water reaction, which may destabilize and/or gel the adhesive prior to the laminating process, making them more difficult to process.

The two-component water-based laminating adhesives can be maintained, prior to the laminating process, at a temperature in a range of from about 10° C. to about 40° C., and preferably from about 15° C. to about 30° C. A temperature outside this range may be undesirable in that a temperature less than 15° C. can increase the dispersion's viscosity, making it more difficult to process. Alternatively, a temperature greater than about 30° C. can accelerate the isocyanate/water reaction to destabilize and adversely affect the adhesive's flow characteristics.

The laminating adhesives may have a viscosity in a range of from about 25 cps to about 2,000 cps, preferably from about 50 cps to about 1,000 cps and can be applied by spraying, roll coating, brushing or dipping. Thin flexible films are preferably roll coated using a rotogravure. The adhesives can be applied to a wide variety of substrates including paper, polyethylene, polypropylene, polyesters, nylon, ethylene vinyl acetate, cellophane, polyvinyl chloride, metallized films and aluminum foil.

The adhesives of the present invention may be coated onto flexible substrates using conventional laminating units. A suitable unit includes the geometric C/L-400 coater/laminator from Geometric Machines (Edison, N.J.). The laminating process typically involves roll coating the adhesive, using a gravure cylinder, onto a first flexible substrate at an application rate of about 0.25 grams/meters$^2$ to about 10.0 grams/meters$^2$, based on solids. After the adhesive has been applied it is dried at a temperature of about 25° C.–200° C. using methods known in the art (i.e., circulating ovens, gas impingement drier, infrared radiation, heat lamps). The dry-coated substrate is then mated with a second flexible substrate or web, which may be the same or different from the first substrate. Typically, the substrates are mated together using a nip pressure of about 1.4 kilograms per square centimeter to about 4.2 kgs/sq cm and a nip temperature of about 25° C. to about 200° C., for 1–2 seconds.

The present invention is further illustrated by the following examples.

EXAMPLES

In the examples, the following test methods were used:

Particle Size Distribution

The two-component water-based laminating adhesives' particle size distributions were evaluated using a BI-90 particle sizer from Brookhaven Instruments Corporation (Holtsville, N.Y.).

Humidity Resistance Test

The two-component water-based laminating adhesives were aged, at ambient room temperatures, for 0 hours and 6 hours and then used to form dry-bond laminates. The laminates, polyethylene terphthalate to polyethylene, were prepared using a geometric C/L-400 coater/laminator unit run at a rate of 91.4 meters/mm (300 ft/min). The adhesives were coated onto the polyethylene terphthalate substrate using a rotogravure set at a level of 453.6 grams solid material per 91.4 meters$^2$ (1.0 lbs/300 ft$^2$). The coated substrate was then passed through a 4.57 meter (15 foot) drying oven, set at a temperature of 65.5° C., and then mated with aluminum foil using a nip temperature of 65.5° C. and a nip pressure of 2.8 kgs/sq cm (40 psi). The bonded laminates were used to prepare 10.16 cm by 10.16 cm pouches. The pouches were then filled with water, allowed to cure for 1 day or 3 days, and placed in a test chamber at ambient room temperature having 100% relative humidity. After 1 day and 6 days, the laminates were visually inspected for signs of delamination or tunneling. The laminates "pass" the humidity test if no visible signs of delamination or tunneling are detected.

The "parts" terminology of the disclosure is intended to mean parts by weight.

Example 1

Example 1 describes the particle size distribution of two-component water-based laminating adhesive using different water dispersible polyisocyanates.

Compound 1

98 parts of the anionic polyurethane dispersion Hydroflex® WD-4009 from H.B. Fuller Company (St. Paul, Minn.) was blended with 2 parts of Bayhydru XP-7063 which is a water dispersible polyisocyanate, based on the isocyanurate of hexamethylene diisocyanate, from Bayer Corporation (Pittsburgh, Pa.). The materials were blended together at ambient temperatures using mechanical agitation. The sample's particle size distribution was evaluated after 6 hours at 25° C. The sample had an average particle size distribution of 55 nm.

Comparative Example A 98 parts of the anionic polyurethane dispersion Hydroflex® WD-4009 from H.B. Fuller Company (St. Paul, Minn.) was blended with 2 parts of Basonat® FDS 3425 which is a water dispersible polyisocyanate, based on the biuret of hexamethylene diisocyanate, from BASF Wyandotte Corporation (Charlotte, N.C.). The materials were blended together at ambient temperatures using mechanical agitation. The sample's particle size distribution was evaluated after 6 hours at 25° C. The sample had an average particle size distribution of 136 nm.

The data shows the inventive laminating adhesive (Compound 1), comprising the isocyanurate of hexamethylene diisocyanate, has a lower average particle size distribution compared to Example A, showing the utility of the invention.

Example 2

Example 2 describes the particle size distribution of two-component water-based laminating adhesive using different water dispersible polyisocyanates.

Compound 1

98 parts of the anionic polyurethane dispersion Hydroflex® WD-4003 from H.B. Fuller Company (St. Paul, Minn.) was blended with 2 parts of Bayhydur® XP-7063. The materials were blended together at ambient temperatures using mechanical agitation. The sample's particle size distribution was evaluated after 6 hours at 25° C. The sample had an average particle size distribution of 57 nm.

Comparative Example B 98 parts of the anionic polyurethane dispersion Hydroflex® WD-4003 from H.B. Fuller Company (St. Paul, Minn.) was blended with 2 parts of Basonat® FDS 3425. The materials were blended together at ambient temperatures using mechanical agitation. The sample's particle size distribution was evaluated after 6 hours at 25° C. The sample had an average particle size distribution of 87 nm.

The data shows the inventive laminating adhesive (Compound 1), comprising the isocyanurate of hexamethylene diisocyanate, has a lower average particle size distribution compared to Example B, showing the utility of the invention.

Example 3

Example 3 describes the water resistance properties of the compounds described in Example 2, using the humidity resistance test.

| Laminate Cure | 1 Day Cure | | 3 Day Cure | |
| --- | --- | --- | --- | --- |
| Pot Cure | 0 Hours | 6 Hours | 0 Hours | 6 Hours |
| Compound 1 | Pass | Pass | Pass | Pass |
| Example B | Fail | Fail | Fail | Fail |

The data shows the inventive laminating adhesive (Compound 1), comprising the isocyanurate of hexamethylene diisocyanate has enhanced water resistance properties compared to Example B, showing the utility of the invention.

Example 4

Example 4 describes the particle size distribution of two-component water-based laminating adhesive using different water dispersible polyisocyanates.

Compound 1

98 parts of the anionic polyurethane dispersion Hydroflex® WD-4006 from H.B. Fuller Company (St. Paul, Minn.) was blended with 2 parts of Bayhydur® XP-7063. The materials were blended together at ambient temperatures using mechanical agitation. The sample's particle size distribution was evaluated after 6 hours at 25° C. The sample had an average particle size distribution of 72 nm.

Comparative Example C 98 parts of the anionic polyurethane dispersion Hydroflex® WD-4006 from H.B. Fuller Company (St. Paul, Minn.) was blended with 2 parts of Basonat® FDS 3425. The materials were blended together at ambient temperatures using mechanical agitation. The sample's particle size distribution was evaluated after 6 hours at 25° C. The sample had an average particle size distribution of 104 nm.

The data shows the inventive laminating adhesive (Compound 1), comprising the isocyanurate of hexamethylene diisocyanate, has a lower average particle size distribution compared to Example C, showing the utility of the invention.

Example 5

Example 5 describes the water resistance properties of the compounds described in Example 4, using the humidity resistance test.

| Laminate Cure | 1 Day Cure | | 3 Day Cure | |
| --- | --- | --- | --- | --- |
| Pot Cure | 0 Hours | 6 Hours | 0 Hours | 6 Hours |
| Compound 1 | Fail | Fail | Pass | Pass |
| Example C | Fail | Fail | Fail | Fail |

The data shows the inventive laminating adhesive (compound 1), comprising the isocyanurate of hexamethylene diisocyanate, has enhanced water resistance compared to Example C after a 3 day cure, showing the utility of the invention.

What is claimed is:

1. A two-component water-based laminating adhesive comprising the reaction product of
   a) at least one aqueous polyurethane dispersion; and
   b) at least one water dispersible polyisocyanate made from isocyanurate of hexamethylene diisocyanate;
   wherein said adhesive has an average particle size distribution of from about 40 nanometers to about 80 nanometers, prior to the laminating process.

2. The laminating adhesive as described in claim 1 wherein the adhesive is maintained at a temperature in a range of from about 15° C. to about 30° C., prior to the laminating process.

3. The laminating adhesive as described in claim 1, wherein said polyurethane dispersion is an anionic polyurethane dispersion.

4. The polyurethane dispersion as described in claim 3, wherein said dispersion is neutralized with a tertiary amine.

5. The laminating adhesive as described in claim 1, wherein said polyurethane dispersion is present in a range of from about 95 parts to about 99 parts, based on 100 parts by weight of the adhesive.

6. The laminating adhesive as described in claim 1, wherein said dispersible polyisocyanate is present in a range of from about 1 part to about 5 parts, based on 100 parts by weight of the adhesive.

7. The laminating adhesive as described in claim 1, wherein said adhesive has a solid content in a range of from about 30 percent by weight to about 40 percent by weight.

8. The laminating adhesive as described in claim 1, wherein said adhesive has a pH in a range of from about 7 to about 9.

9. The laminating adhesive as described in claim 1, wherein said adhesive has a viscosity less than about 1,000 centipoise at 25° C.

10. A method for the preparation of dry-bonded laminates comprising the steps of
    a) coating a first flexible substrate with a laminating adhesive comprising:
       i) at least one aqueous polyurethane dispersion; and
       ii) at least one water dispersible polyisocyanate based on the isocyanurate of hexamethylene diisocyanate;
    b) drying the coated flexible substrate with forced air and heat, to form a dry coated substrate; then
    c) applying onto dry-coated substrate a second flexible substrate using heat and pressure;
    wherein said adhesive has an average particle size distribution of about 40 nanometers to about 80 nanometers, prior to laminating process.

11. The method as described in claim 10, wherein said adhesive is maintained at a temperature in a range of from about 15 degrees centigrade to about 30 degrees centigrade, prior to the laminating process.

12. A method as described in claim 10, wherein the flexible substrate is selected from the group consisting of paper, polyethylene, polypropylene, polyesters, nylon, ethylene vinyl acetate, cellophane, polyvinyl chloride, metallized films and aluminum foil.

13. A method as described in claim 10, wherein said dispersion and said polyisocyanate are blended together at ambient temperatures.

14. A method as described in claim 10, wherein said dispersion and said polyisocyanate are blended together using mechanical agitation.

15. A method as described in claim 10, wherein said adhesive is roll coated onto a first flexible substrate using a gravure cylinder.

16. A method as described in claim 15, wherein said adhesive is roll coated onto a flexible substrate at a quantity of about 0.25 grams per meters to about 10 grams per meters$^2$, based on solids.

17. A method as described in claim 10, wherein the coated substrate is dried using temperatures in a range of from about 25 degrees centigrade to about 200 degrees centigrade.

18. A method as described in claim 10, wherein the dry-coated substrate is mated with a second flexible substrate using a nip temperature in a range of from about 25 degrees centigrade to about 200 degrees centigrade.

19. A method as described in claim 10, wherein the dry-coated substrate is mated with a second flexible film using a nip pressure in a range of from about 1.4 kilograms per square centimeter to about 4.2 kilograms per square centimeter.

20. A bonded laminate comprising the adhesive described in claim 1, wherein said laminate comprises two flexible substrates selected from the group consisting of paper, polyethylene, polypropylene, polyesters, nylon, ethylene vinyl acetate, cellophane, polyvinyl chloride, metallized films, aluminum foil and mixtures thereof.

* * * * *